Nov. 1, 1949 L. BOTIMER 2,486,915
SUGAR BEET HARVESTER
Original Filed June 24, 1943 4 Sheets-Sheet 1
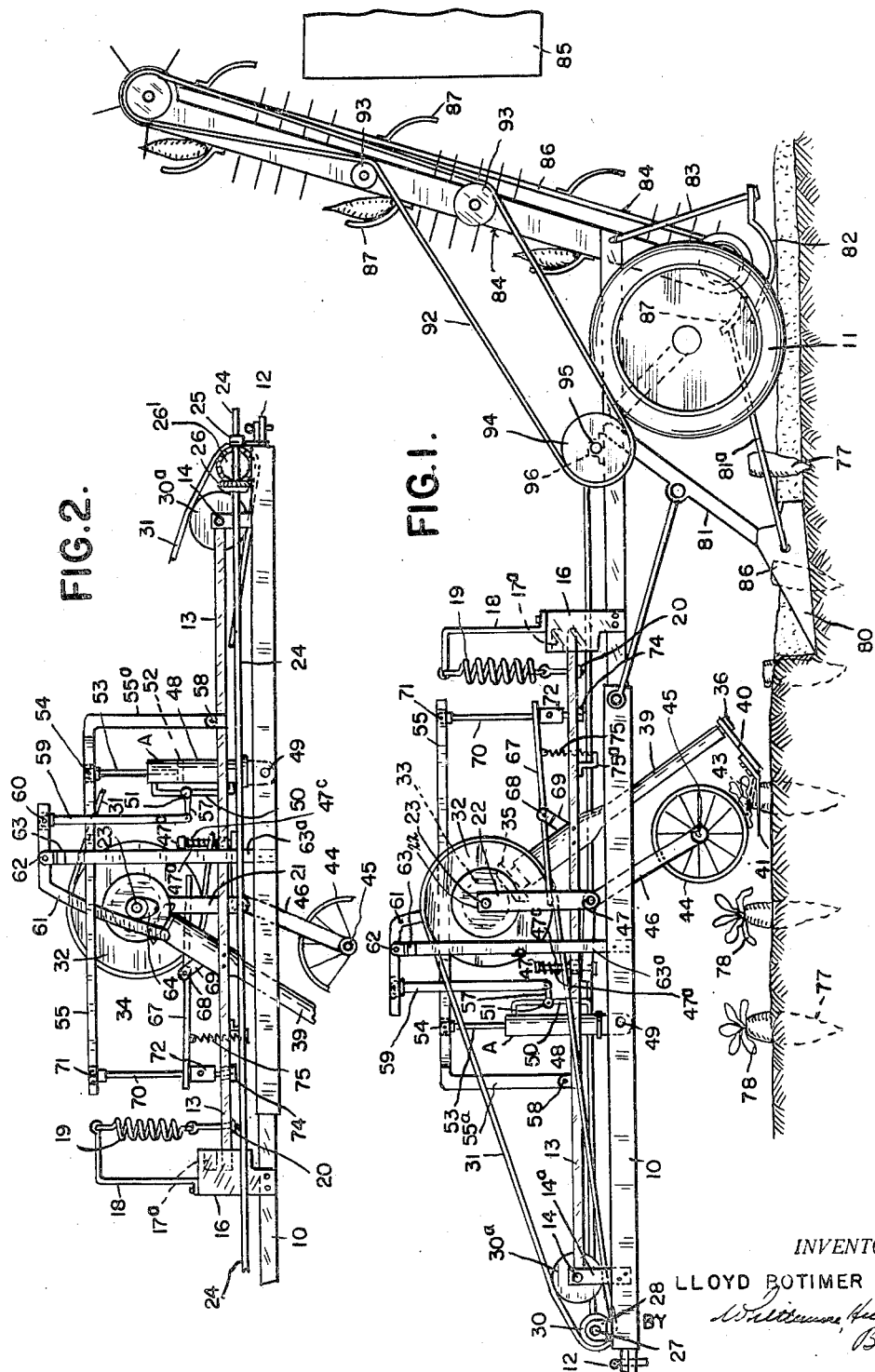
INVENTOR.
LLOYD BOTIMER
ATTORNEYS Nov. 1, 1949     L. BOTIMER     2,486,915
SUGAR BEET HARVESTER
Original Filed June 24, 1943     4 Sheets-Sheet 2
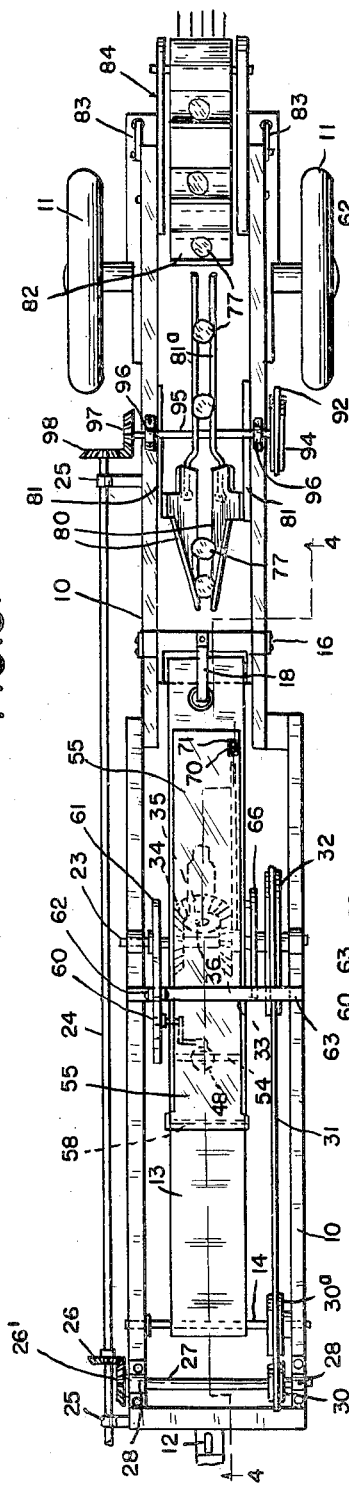
INVENTOR.
LLOYD BOTIMER
ATTORNEYS Nov. 1, 1949 — L. BOTIMER — 2,486,915
SUGAR BEET HARVESTER
Original Filed June 24, 1943 — 4 Sheets-Sheet 3
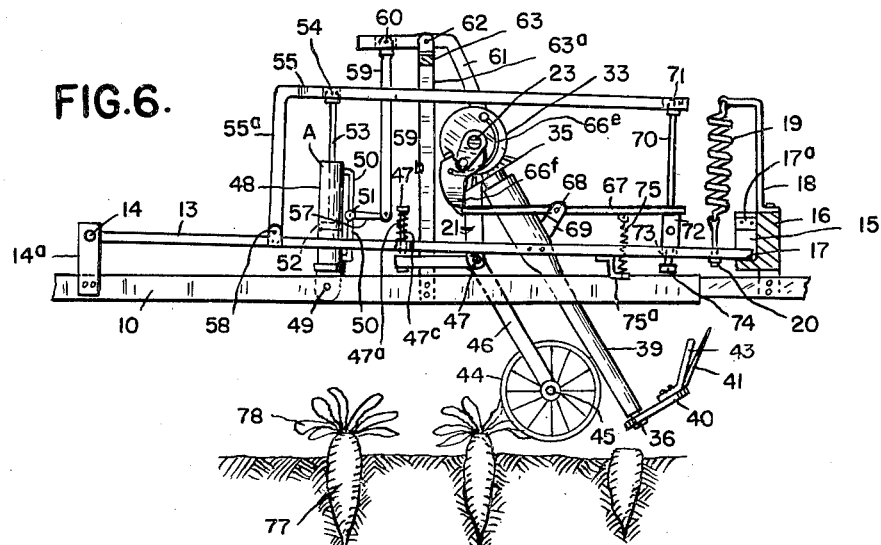
FIG.6.
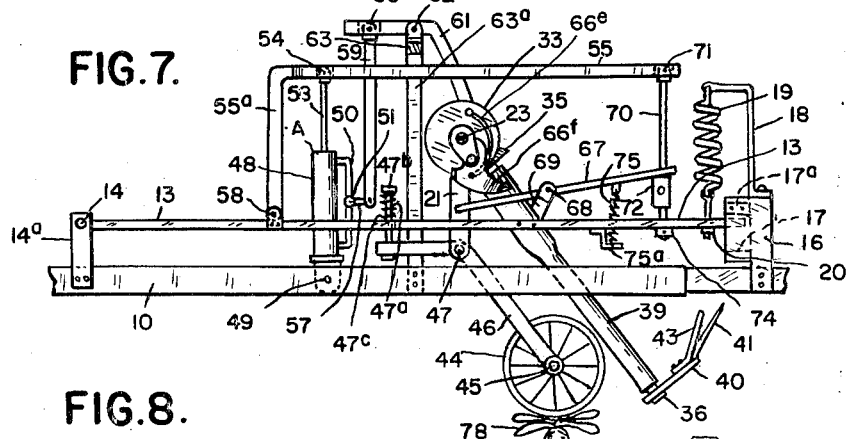
FIG.7.
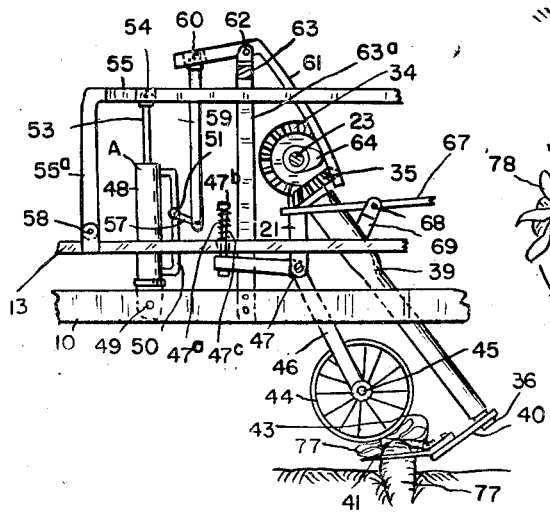
FIG.8.
FIG.9.
INVENTOR.
LLOYD BOTIMER
BY
ATTORNEYS Nov. 1, 1949  L. BOTIMER  2,486,915
SUGAR BEET HARVESTER
Original Filed June 24, 1943  4 Sheets-Sheet 4
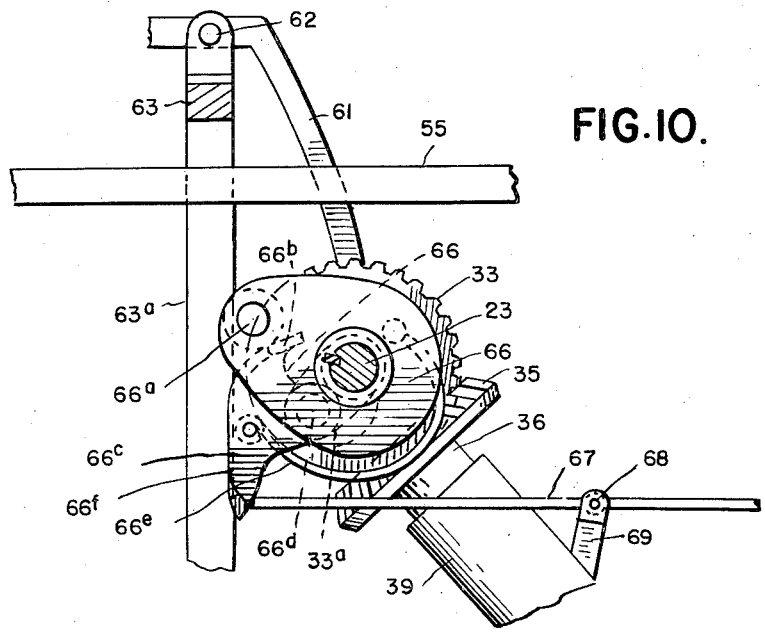
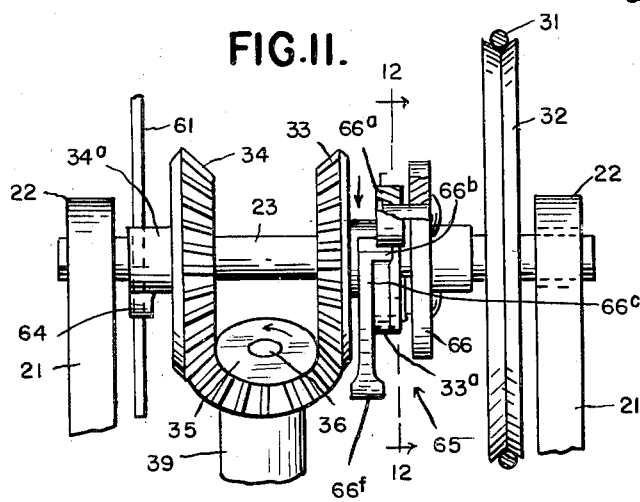
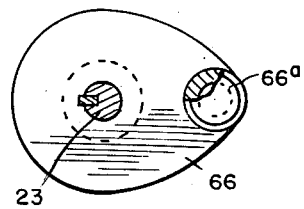
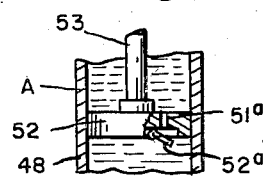
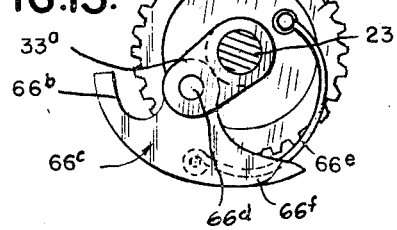
INVENTOR.
LLOYD BOTIMER
BY
ATTORNEYS Patented Nov. 1, 1949

2,486,915

UNITED STATES PATENT OFFICE 2,486,915

SUGAR BEET HARVESTER

Lloyd Botimer, Vassar, Mich.

Continuation of application Serial No. 492,077, June 24, 1943. This application April 3, 1946, Serial No. 659,322

9 Claims. (Cl. 56—121.4)

This invention relates generally to beet harvesters, especially to the beet topping mechanism thereof, and constitutes a continuation of my application, filed June 24, 1943, bearing Serial No. 492,077, now abandoned.

One of the essential objects of the invention is to provide a beet topping mechanism having means capable of cutting off by one slash in a predetermined horizontal plane above the ground the top of an upstanding sugar beet.

Another object is to provide a beet topping mechanism having means capable of cutting off successively as aforesaid the tops of beets in a given row.

Another object is to provide a beet topping mechanism having means operated through contact with individual beets for determining the position of the cutting means relative to the crowns of the respective beets during each slashing operation.

Another object is to provide a beet topping mechanism having means operable by means associated with the determining means just mentioned for controlling the action of the cutting means so that the topping action may occur at the right place and at the right time.

Another object is to provide a beet topping mechanism that operates without crushing or injuring the body portions of the beets encountered, and has means operable after each topping operation for casting aside the cut tops of said beets so that they will be out of the way when the remaining body portions of said beets are gathered from the ground.

Another object is to improve generally and render more efficient beet topping mechanism of the type mentioned.

Other objects, advantages and novel details of construction of this invention will be made more apparent as this description proceeds, especially when considered in connection with the accompanying drawings, wherein:

Figure 1 is a view in side elevation, showing my improved beet harvester in the operation of harvesting beets;

Figure 2 is a fragmentary side elevation of such harvester taken from the opposite side from Figure 1;

Figure 3 is a plan view of the harvester;

Figure 4 is a vertical section taken on the plane of line 4—4 of Figure 3;

Figure 5 is a vertical sectional view taken on the plane of line 5—5 of Figure 4;

Figure 6 is a fragmentary side elevation showing parts in lowermost position immediately after a topping operation;

Figure 7 is a fragmentary side elevation showing parts raised to the proper topping level;

Figure 8 is a fragmentary side elevation showing parts in position during a topping operation;

Figure 9 is a horizontal section looking on the cutting knife, and adjacent parts, from above, and suggesting its path of movement with arrows;

Figure 10 is an enlarged section at the clutch and drive for the cutting mechanism;

Figure 11 is a fragmentary view of the parts of Figure 10 looking from the left of the latter;

Figure 12 is a section taken on line 12—12 of Figure 11;

Figure 13 is a section taken on said line 12—12 but looking in the opposite direction to Figure 12; and Figure 14 is an enlarged fragmentary section through the dash-pot which adjustably holds the floating frame.

Referring specifically to the drawings wherein like reference characters designate like or similar parts, 10 is a horizontal main frame provided at its rear end with suitably mounted ground wheels 11 and provided at its forward end with a clevis or coupling means 12 whereby the frame may be attached to a tractor (not shown) to be drawn over the ground.

13 is an auxiliary floating frame extending over the frame 10 and having its forward end pivotally mounted on a transverse rod 14 carried by uprights 14ª on the frame 10. The rear end of floating frame 13 is disposed loosely in a pocket 15 of a guide bracket 16 secured to the frame 10, and is alternately engageable with a lower stop 17 and an upper stop 17ª at the bottom and top respectively of said pocket. 18 is an inverted L-shaped arm on the bracket 16, and 19 is a counter-balancing coil spring for the floating frame 13 connected at one end to the arm 19 and bolted at 20 to the floating frame 13.

21 are uprights rigid with the floating frame 13, and carrying bearings 22 for a rotatable shaft 23. 24 is a rotatable shaft journaled in bearings 25 on frame 10 and adapted to be driven from the power take-off of the tractor aforesaid or from any other suitable source (not shown). Bevel gears 26 and 26' respectively mesh with each other and transmit power from shaft 24 to a transverse shaft 27 journaled in bearings 28 on the frame 10. A belt 31 is reeved upon a pulley 30 secured to shaft 27 and upon a pulley 32 secured to shaft 23 for transmitting power from shaft 27 to shaft 23. Preferably said belt 31 also engages an idler pulley 30ª on rod 14.

Bevel gears 33 and 34 are freely mounted on shaft 23 at spaced points thereof and mesh with a bevel gear 35 keyed to a cutter operating shaft 36 journaled in an inclined tubular casing 39 rigid with the floating frame 13. The inclined position of casing 39 relative to the ground at all times is such that sufficient clearance is provided between said casing and the cutter parts carried thereby to prevent injury to the beets.

Rigidly connected and disposed at right angles to the lower end of the shaft 36 is a plate 40 carrying a knife 41 having a cutting edge 42, the arrangement being such that the knife 41 will be approximately in a horizontal position when topping the beets 77. Such knife 41 travels in the direction of the arrows in Figure 9. On the plate 40 behind the knife is a rod 43 which is adapted to push the beet tops 78 aside after they have been severed by the knife 41 from the beets.

Preferably two feeler or gauge wheels 44 of suitable diameter are suspended from the floating frame 13. As shown, these wheels 44 are arranged in spaced-apart relation on an axle 45 carried by bell crank levers 46 pivoted on a rod 47 extending through the uprights 21 that are rigid with the floating frame 13. Pivotally connected to the bell crank levers 46 are rods 47$^a$ that extend freely through the floating frame 13 and are provided at their upper ends with heads 47$^b$. Coil springs 47$^c$ are sleeved on said rods 47$^a$ between the heads 47$^b$ thereof and the floating frame 13. Normally the coil springs 47$^c$ maintain the feeler wheels 44 in an operative beet feeling position whereby the feeler wheels 44, bell crank levers 46 and floating frame 13 will rise as a unit when the feeler wheels encounter a normal size beet. However, after the rear end of the floating frame 13 abuts the stop 17$^a$ at the top of pocket 15, then the coil springs 47$^c$ will permit pivotal movement of the bell crank levers 46 on their pivot rod 47 relative to the floating frame 13 when the feeler wheels 44 encounter an abnormally large size beet. In this connection it should be borne in mind that the weight of the floating frame 13 and associated parts is counterbalanced by the spring 19, hence it will be apparent that the function of the springs 47$^c$ is merely to control the position of the feeler wheels 44 relative to the floating frame 13. Actually the engagement of the rear end of floating frame 13 with the stop 17 at the bottom of pocket 15 limits the downward movement of the feeler wheels 44 relative to the ground. As the feeler wheels 44 encounter a beet, such wheels will ride upwardly over the crown of the beet and during such upward movement will cause the rear end of the floating frame 13 and casing 39 carried thereby to be raised accordingly.

For temporarily holding the rear end of the floating frame 13 in the raised position just mentioned, I have provided suitable hydraulic mechanism A, which briefly described, comprises a hydraulic cylinder 48 pivoted at 49 to the main frame 10 and containing a suitable hydraulic medium, a piston 52 slidable within said cylinder and having a rod 53 extending outwardly through the upper end wall of said cylinder and pivotally connected at 54 to a substantially L-shaped arm 55 which in turn is pivoted at 58 to the floating frame 13, a by-pass 50 for the hydraulic medium, and a control valve 51 in said by-pass. Preferably the piston 52 is provided vertically therethrough with a passage 51$^a$ through which the hydraulic medium may flow during upward movement of the piston 52 in the cylinder, and said passage 51$^a$ is provided on the underside of the piston 52 with a flap-type check valve 52$^a$ to prevent the flow of the hydraulic medium through the passage 51$^a$ during downward movement of the piston in the cylinder.

Preferably valve 51 has an arm 57 pivoted to the lower end of a vertical link 59 which in turn is pivoted at 60 to an inverted substantially L-shaped lever 61 pivoted at 62 on a cross bar 63 connecting uprights 63$^a$ that are rigid with the frame 10. The lever 61 is actuable by a cam 64 rigid with the hub 34$^a$ of the bevel gear 34.

For connecting the bevel gear 33 to the shaft 23, I have provided a suitable clutch 65 which preferably comprises a cam-shaped plate 66 provided at one extremity thereof with a laterally projecting pin or stud 66$^a$ which is adapted to be engaged by an arm 66$^b$ of a lever 66$^c$ pivoted at 66$^d$ on an arm 33$^a$ which is loose on the shaft 23 and rigid with one side of bevel gear 33. A curved or arched spring 66$^e$ terminally anchored to a side portion of the bevel gear 33 and to an arm 66$^f$ of the lever 66$^c$ is adapted to move the arm 66$^b$ into operative clutching relation with the pin 66$^a$ when a suitable trip lever 67 is disengaged from abutting relation with the arm 66$^f$ of the clutch lever 66$^c$. Said trip lever 67 comprises a substantially straight rod pivoted at 68 to a lug 69 projecting from the casing 39.

A positioning rod 70 for the trip lever 67 passes loosely through an opening in the trip lever 67 and is pivotally connected at 71 to the rear end of arm 55. The trip lever 67 is actuable by a collar 72 mounted on the positioning rod 70 and is normally held in engagement with said collar 72 by means of a coil spring 75. Preferably such rod 70 passes through an opening 73 in the floating frame 13 and is provided beneath the floating frame 13 with a collar 74 for engagement with the underside of said floating frame. The coil spring 75 is terminally connected to the trip lever 67 and to a bracket 75$^a$ rigid with the floating frame 13 and is not only adapted to hold the trip lever in engagement with the collar 72 on the rod 70, but is adapted, after the valve 51 has been opened, to cause the rod 70 and rear end of the L-shaped arm 55 to move downwardly until the collar 72 on said rod 70 abuts the upper side of the floating frame.

In operation, the machine is drawn by a suitable tractor (not shown) over the ground so that the feeler wheels 44 may ride lengthwise over a row of uncut beets 77. As the feeler wheels 44 encounter a beet, they ride upwardly over the crown of said beet, and such upward movement of the wheels is imparted through the wheel supports 46 to the rear end of the floating frame 13 so that said rear end of the floating frame 13, casing 39, collar 72, rod 70, trip lever 67 and L-shaped arm 55 as a unit will be raised accordingly. Actually the upward movement of the rear end of the floating frame is proportionate to the height of the beet over which the feeler wheels ride. As the rear end of the floating frame 13 is raised as described, the upwardly moving L-shaped arm 55 causes the rod 53 to move the piston 52 upward in the cylinder 48. During this upward movement of the piston the hydraulic medium in the cylinder 48 above the piston flows downwardly through the passage 51$^a$ in the piston to the lower portion of said cylinder beneath said piston. At this time the cut-off valve 51 in by-pass 50 is closed, hence hydraulic medium within the cylinder 48 below the piston 52 is trapped and supports the piston 52 and arm 55 in raised position.

After the feeler wheels 44 pass over the crown of the beet, the weight of the floating frame 13 is transferred from the feeler wheels 44 to the piston 52 within the hydraulic cylinder. For example, the rear end of the floating frame 13 falls onto the collar 74 on the rod 70, and during this falling movement of the rear end of the floating frame, the pivot 54 at the upper end of the piston rod 53 becomes a fulcrum for the arm 55, whereby the falling floating frame 13 will exert a downward pull on the upright part 55a of arm 55 in advance of said fulcrum and will cause the rear end of said arm 55 and the rod 70 to be moved upwardly. During this upward movement of the rod 70, the lever 67 will be tripped by the collar 72 from the arm 66f of the lever 66c. Then the spring 66e will swing the arm 66b of the lever 66c into clutching relation with the pin 66a to cause the bevel gear 33 to be driven by the shaft 23. Bevel gear 33 now drives inclined shaft 36 which in turn swings the plate 40 anticlockwise as in Figure 9 so that the knife 41 will cut off horizontally the top portion 78 of the beet. The rod 43 on the plate 40 follows the knife 41 and moves aside the cut off top portion 78 of the beet. Thus, from the foregoing, it will be apparent that the distance the rear end of the floating frame 13 is moved upwardly before each cutting operation is dependent upon the extent the feeler wheels 44 ride upwardly over each beet. Hence, the height or elevation from the ground of the crown of each upstanding beet encountered by said feeler wheels will determine the extent the feeler wheels 44 ride upwardly and, accordingly, will determine the distance the rear end of the floating frame 13 is raised. The hydraulic means A will check the downward or falling movement of the rear end of said floating frame relative to the main frame 10 after the feeler wheels 44 pass over the crown of a beet, allowing the lever 67 to be tripped from the clutch lever 66c so that the drive to the knife 41 may be established. This checking action determines the elevation of the rear end of said floating frame relative to said main frame so that the cutting action of the knife 41 will be at the proper elevation relative to the ground to top the beet as desired.

After the top portion 78 of the beet has been cut off as described, the cam 64 trips the lever 61 so that said lever will move the rod 59 and arm 57 to open the valve 51 so that hydraulic medium in the cylinder 48 and by-pass 50 will be displaced by the weight of the parts to which the piston 52 is subjected. For example, when hydraulic medium flows through the by-pass 50 the piston 52 moves downwardly in the cylinder 48 and allows the rear end of the floating frame 13 to fall onto the stop 17. Also, such displacement of the hydraulic medium permits the spring 75 to draw downwardly the rear end of lever 67 so that the forward end thereof will again engage the arm 66f and form a stop for the lever 66c. This will free the lever 66c from clutching engagement with the pin 66a, hence the driving connection from the shaft 23 to the bevel gear 33 will be broken. As a result, the plate 40 and knife 41 and rod 43 carried thereby will stop in the position illustrated in Figure 6. After the cam 64 clears the lever 61, the weight of the lever 61 acting upon the rod 59 and arm 57 will again close the valve 51. Thus, the topping mechanism has completed one topping operation on one beet of a row and is ready to repeat the operation on the succeeding beet of the row.

The shape of the knife 41 and the shape of the plate 40 and the positions thereof relative to each other and to the shaft 36, as well as the size and position of the feeler wheels 44 relative to the knife 41 are all important factors of my topping mechanism. The angle at which the knife 41 is disposed relative to the plate 40 enables the knife to make a practically horizontal cut on the beet as shown in Figures 1, 4 and 8. The shaft 36 is located close to an edge of the plate 40 so that in the rest position thereof after the rear end of the floating frame 13 has fallen, there is enough clearance between the plate 40 and the topped beet to avoid destroying the same as the cutting mechanism passes over it.

After the beets are topped as described they are removed from the ground by conventional plows 80 which are suitably suspended from the frame 10 by braces 81. The beets are forced longitudinally of said plows 80 onto and longitudinally of a pair of rods 81a from which they drop into a suitable trough or receptacle 82 supported by braces 83 from the frame 10. From the trough 82 the beets are removed by a conventional elevator 84 which dumps them into piles in the field or into a wagon body or hopper 85 for delivery to the factory as desired.

Preferably the elevator 84 includes an endless belt 86 which has forks 87 to pick up the beets in the trough 82 and to lift the same therefrom. Said elevator belt 86 may be driven by any suitable means. Preferably a belt 92 reeved upon idler pulleys 93 is driven by a pulley 94 on a countershaft 95 journaled in bearings 96 and driven from shaft 24 by bevel gears 97 and 98.

What I claim as my invention is:

1. Beet harvesting apparatus comprising a supporting frame movable over a row of beets, a rotatable knife carried by the supporting frame in a position to successively engage the beets and cut the top portions off of the beets, means supporting the knife on said frame adjustable to vary the elevation of the knife relative to the ground, means operable during the intervals between successive cutting operations to lift the supporting means and raise the knife an amount determined by the extent the beet preceding the knife projects above the ground, and driving means for the knife rendered operative by upward movement of the supporting means.

2. Beet harvesting apparatus comprising a supporting frame movable over a row of beets, a rotatable knife carried by the frame in a position to successively engage the beets and cut the top portions off of the beets, means supporting the knife on the frame adjustable to vary the elevation of the knife relative to the ground, means for determining the elevation of the knife between successive cutting operations including a rotatable member carried by the supporting means in a position to engage the beets in advance of the knife, driving mechanism for rotating the knife, and means operated by upward movement of the supporting means for connecting the driving mechanism to said knife.

3. Beet harvesting apparatus comprising a supporting frame movable over a row of beets, a rotatable knife carried by the frame in a position to successively engage the beets and cut off the top portions of the beets, means supporting the knife on said frame adjustable to vary the elevation of the knife relative to the ground, a wheel connected to the supporting means in a position to engage the beets in advance of the knife and movable upwardly by the beets to raise the knife supporting means relative to the frame, driving means for rotating the knife, a clutch for connecting the driving means to and for disconnecting the driving means from the knife, a connection between the clutch and supporting means operated by upward movement of the supporting means to engage the clutch and operated by downward movement of the supporting means to disengage said clutch.

4. Beet harvesting apparatus comprising a supporting frame movable over a row of beets, a rotatable cutter carried by the frame in a position to successively engage the beets and cut the tops off the beets, means supporting the cutter on the frame adjustable in a vertical direction to vary the elevation of the cutter relative to the ground, a feeler means carried by the cutter supporting means in a position to engage the beets in advance of the cutter and raise the cutter supporting means together with the cutter prior to the cutting operation, releasable means for holding the cutter supporting means in its raised position during the cutting operation, and means operating in timed relation to rotation of the cutter for releasing said means to permit return movement of the cutter supporting means.

5. Beet harvesting apparatus comprising a supporting frame movable over a row of beets, a rotatable knife carried by the frame in a position to successively engage the beets and cut the top portions off of the beets, means supporting the knife on said frame adjustable vertically to vary the elevation of the knife relative to the ground, a wheel connected to the supporting frame in a position to engage the beets in advance of the knife and lift the supporting frame together with the knife prior to the cutting operation, releasable means for holding the knife supporting means in its elevated position during the cutting operation, a drive shaft for the knife, releasable clutch mechanism for connecting the drive shaft to the knife, a connection between the supporting means and clutch mechanism operated by upward movement of the supporting means for engaging the clutch to effect rotation of the knife and operated by downward movement of the supporting means to disengage the clutch mechanism, and means for releasing the holding means just prior to disengaging said clutch mechanism.

6. Beet harvesting apparatus comprising a supporting frame movable over a row of beets, an auxiliary frame pivoted at one end to the supporting frame for vertical swinging movement, a rotatable knife carried by the auxiliary frame in a position to successively engage the beets and cut the tops off of the beets, a wheel rotatably supported on the auxiliary frame in a position to engage the beets in advance of the knife, means for holding the auxiliary frame in its raised position during the cutting operation, said holding means comprising a vertical cylinder containing a fluid and secured at the lower end to the supporting frame, a piston slidably mounted in the cylinder and connected to the auxiliary frame for movement by the latter, and a valve controlled port through the piston permitting relatively free flow of fluid in a downward direction through the piston and preventing flow of fluid upwardly through the piston.

7. Beet harvesting apparatus comprising a supporting frame movable over a row of beets, an auxiliary frame pivoted at one end to the supporting frame for vertical swinging movement, a rotatable knife carried by the auxiliary frame in a position to successively engage the beets and cut the tops off of the beets, a wheel rotatably supported on the auxiliary frame in a position to engage the beets in advance of the knife, means for holding the auxiliary frame in its raised position during the cutting operation, said holding means comprising a vertical cylinder containing a fluid and secured at the lower end to the supporting frame, a piston slidably mounted in the cylinder and connected to the auxiliary frame for movement by the latter, and means operating in timed relation to rotation of the knife for by-passing fluid from the lower end of the cylinder below the piston to the upper end of the cylinder above the piston.

8. Beet harvesting apparatus comprising a supporting frame movable over a row of beets, an auxiliary frame pivoted at one end to the supporting frame for vertical swinging movement, a knife rotatably supported on the auxiliary frame adjacent the swinging end thereof and positioned to successively engage the beets to cut off the tops of the beets, a wheel supported on the auxiliary frame in a position to engage the beets in advance of the knife, means for holding the auxiliary frame in a raised position including a vertical cylinder having one end secured to the supporting frame and containing a fluid, a piston slidably supported in the cylinder and having a port therethrough permitting relatively free flow of fluid downwardly through the piston, valve means for the port preventing upward flow of fluid through the piston, a by-pass for the fluid connecting the cylinder at opposite sides of the piston, a valve controlling said by-pass, and means operating in timed relation to rotation of the knife to open said valve and permit downward movement of the auxiliary frame.

9. Beet harvesting apparatus comprising a supporting frame movable over a row of beets, an auxiliary frame pivoted at one end to the supporting frame for vertical swinging movement, a rotatable knife supported on the auxiliary frame adjacent the swinging end of the latter and positioned to successively engage the beets to cut off the top portions of the beets, a wheel supported on the auxiliary frame in a position to engage the beets in advance of the knife to raise the auxiliary frame, driving means for the knife, releasable clutch mechanism for connecting the driving means to the knife, a connection between the auxiliary frame and clutch mechanism operated by upward movement of the auxiliary frame for engaging the clutch mechanism to impart rotation to the knife and operated by downward movement of the auxiliary frame to disengage the clutch mechanism, and means for releasing the holding means just prior to disengaging said clutch mechanism.

LLOYD BOTIMER.

REFERENCES CITED

The following references are of record in the file of this patent:

UNITED STATES PATENTS

| Number | Name | Date |
|---|---|---|
| 773,279 | Dewey | Oct. 25, 1904 |
| 919,342 | Gettelmann | Apr. 27, 1909 |
| 1,099,643 | Goode | June 9, 1914 |
| 1,568,810 | Djuberg | Jan. 5, 1926 |
| 1,568,811 | Djuberg | Jan. 5, 1926 |

FOREIGN PATENTS

| Number | Country | Date |
|---|---|---|
| 88,190 | Germany | Sept. 21, 1896 |
| 54,900 | Austria | Aug. 10, 1912 |